US005616223A

United States Patent [19]
Shen et al.

[11] Patent Number: 5,616,223
[45] Date of Patent: *Apr. 1, 1997

[54] MIXED IONIC-ELECTRONIC CONDUCTING COMPOSITES FOR OXYGEN SEPARATION AND ELECTROCATALYSIS

[75] Inventors: Yousheng Shen; Ashok V. Joshi, both of Salt Lake City, Utah; Kevin Krist, Palatine, Ill.; Meilin Liu, Norcross, Ga.; Anil V. Virkar, Salt Lake City, Utah

[73] Assignee: Gas Research Institute, Chicago, Ill.

[*] Notice: The term of this patent shall not extend beyond the expiration date of Pat. No. 5,273,628.

[21] Appl. No.: 231,616

[22] Filed: Apr. 22, 1994

Related U.S. Application Data

[63] Continuation-in-part of Ser. No. 146,880, Nov. 1, 1993, Pat. No. 5,478,444, which is a continuation-in-part of Ser. No. 882,175, May 11, 1992, Pat. No. 5,273,628.

[51] Int. Cl.$^6$ .................................................. C25B 13/00
[52] U.S. Cl. .................. 204/295; 204/252; 204/421; 205/344; 429/33; 252/518; 252/519; 252/520; 252/521; 501/103; 501/123; 501/126; 501/134; 501/152
[58] Field of Search .................. 204/295, 252, 204/421, 59 R; 252/518, 519, 520, 521; 429/33; 501/103, 123, 126, 134, 152; 210/500.1, 500.21

[56] References Cited

U.S. PATENT DOCUMENTS

| | | | |
|---|---|---|---|
| 3,956,194 | 5/1976 | Armand | 522/504 |
| 4,528,083 | 7/1985 | La Conti et al. | 204/290 R |
| 4,793,904 | 12/1988 | Mazanec et al. | 204/59 R |
| 4,802,958 | 2/1989 | Mazanec et al. | 204/80 |
| 4,803,134 | 2/1989 | Sammells | 429/16 |
| 4,812,329 | 3/1989 | Isenberg | 427/115 |
| 4,931,214 | 6/1990 | Worrell et al. | 252/520 |
| 4,933,054 | 6/1990 | Mazanec et al. | 204/80 |
| 5,006,494 | 4/1991 | Virkar | 501/152 |
| 5,273,628 | 12/1993 | Liu et al. | 204/59 R |
| 5,306,411 | 4/1994 | Mazanec et al. | 204/265 |

FOREIGN PATENT DOCUMENTS

| | | |
|---|---|---|
| 0399194 | 5/1990 | European Pat. Off. . |
| 0399833 | 11/1990 | European Pat. Off. . |

OTHER PUBLICATIONS

Liu, Electrode Kinetics and Transport Properties of Mixed Ionic–Electronic Conductors; Proceedings of the First International Symposium on Ionic and Mixed Conducting Ceramics; vol. 91–12; Dec. 1991 pp. 191–215.

Liu et al, Characterization of Mixed Ionic–Electronic Conductors, Proceedings of the First International Symposium on Ionic and Mixed Conducting Ceramics; vol. 91–12; pp. 231–247; Dec. 1991.

Worell, Electrical Properties of Mixed–Conducting oxides Having High Oxygen–Ion Conductivity; pp. 147–151; 1991 No month available.

M.J. Verkerk and A.J. Burggraaf, "High Oxygen Ion Conduction in Sintered Oxides of the Bi2O3–Dy2O3 System", J. Electrochem. Soc., 128, No. 1, 75–82 (1981); No month available.

P.J. Dordor, J. Tanaka and A. Watanabe, "Electrical Characterization of Phase Transition In Yttrium Doped Bismuth Oxide, Bi1.55Y0.4503", Solid State Ionics, 25, 177–181, (1987); No month available.

H.T. Cahen, T.G.M. Van Den Belt, J.H.W. De Wit and G.H.J. Broers, "The Electrical Conductivity of –Bi2O3 Stabilized Bi Isovalent Rare–Earth Oxides R2O3", Solid State Ionics, 1, 411–423, (1980); No month available.

H.T. Cahen, J.H.W. De Wit, A. Honders, G.H.J. Broers and J.P.M. Van Den Dungen, "Thermogalvanic Power And Fast Ion Conduction In –Bi2O3 And—(Bi2O3)1–x(R2O3)x With R=Y, Tb–Lu", Solid State Ionics, 1, 4250440, (1980); No month available.

H. Iwahara, T. Esaka, T. Sato and T. Takahashi, J., "Formation of High Oxides Ion Conductive Phases in the Sintered Oxides of the System Bi2O3–La2)3 System Bi2O3–Ln2O3 (Ln=La–Yb)", Solid State Chem., 39, 173–180, (1981); No month available.

M.J. Verkerk and A.J. Burggraaf, "High Oxygen Ion Conduction In Sintered Oxides Of The Bi2O3–La2O3 System", Solid State Ionics, 3/4, 463–467, (1981) no month available.

*Primary Examiner*—Bruce F. Bell
*Attorney, Agent, or Firm*—Speckman, Pauley & Fejer

[57] ABSTRACT

Composite ceramic mixed ionic and electronic conducting materials having high ambipolar activity which can be fabricated into thin membranes for high efficiency oxygen separation from air at intermediate temperatures. The mixed conducting materials have composite non-homogeneous microstructures of a separate predominantly oxygen ion conductive phase and a predominantly electronic conductive phase. Preferred predominantly oxygen ion conducting phases include bismuth, cerium and zirconium oxide based materials and predominantly electronic conducting phases include at least one metal electronic conductor material.

26 Claims, 8 Drawing Sheets

MIXED IONIC-ELECTRONIC CONDUCTING COMPOSITES FOR OXYGEN SEPARATION AND ELECTROCATALYSIS

CROSS REFERENCE TO RELATED APPLICATIONS

This application is a continuation-in-part of application Ser. No. 08/146,880, filed Nov. 1, 1993, now U.S. Pat. No. 5,478,444, which is a continuation-in-part of application Ser. No. 07/882,175, filed May 11, 1992, now U.S. Pat. No. 5,273,628.

BACKGROUND OF THE INVENTION

1. Field of the Invention

This invention relates to mixed ionic-electronic conducting composite materials with a non-homogeneous microstructure having an oxide phase in which the conductivity is predominantly ionic and a metal phase in which the conductivity is predominantly electronic. The mixed ionic-electronic conducting materials may be fabricated in membrane form and provide both high ionic and high electronic conductivity. The mixed ionic-electronic conducting materials of this invention are useful as an oxygen permeation membrane for pressure driven oxygen separation, and as electrolyte and electrode materials for oxygen exchange reactions.

2. Description of Related Art

Much prior work has centered around stabilizing and increasing oxygen ion conduction of materials such as $Bi_2O_3$. High oxygen ion conduction compared to that of zirconia based electrolytes has been obtained using $Bi_2O_3$ doped with $Er_2O_3$ or $Tm_2O_3$, M. J. Verkerk and A. J. Burggraaf, J. Electrochem. Soc., 128, No. 1, 75–82 (1981), and using $Bi_2O_3$ doped with yttrium, P. J. Dordor, J. Tanaka and A. Watanabe, Solid State Ionics, 25, 177–181, (1987), and using $Bi_2O_3$ doped with $Yb_2O_3$, H. T. Cahen, T. G. M. Van Den Belt, J. H. W. De Wit and G. H. J. Broers, Solid State Ionics, 1, 411–423, (1980). Increasing oxygen ion conductivity and structural stabilization of the FCC phase of $Bi_2O_3$ based electrolytes has been investigated resulting in fast ion conduction in $Bi_2O_3$ doped with oxides of Y and Tb-Lu, H. T. Cahen, J. H. W. De Wit, A. Honders, G. H. J. Broers and J. P. M. Van Den Dungen, Solid State Ionics, 1, 425–440, (1980), and $Bi_2O_3$ doped with oxides of La, Nd, Sm, Dy, Er or Yb, H. Iwahara, T. Esaka, T. Sato and T. Takahashi, J. Solid State Chem., 39, 173–180, (1981), and $Bi_2O_3$ doped with oxides of Er and Dy, M. J. Verkerk and A. J. Burggraaf, Solid State Ionics, 3/4, 463–467, (1981). U.S. Pat. No. 5,006,494 teaches oxygen ion conductivity of $Bi_2O_3$ in the cubic form stabilized by 10–40 mole percent of a rare earth oxide such as yttria is greatly enhanced by inclusion of up to 10 mole percent of an oxide of a cation having a valence of 4 or greater, such as zirconia, hafnia, thoria, stannic oxide, tantalum oxide, and niobium oxide.

Mixed ionic-electronic conductors have been disclosed as solid electrolyte materials and for electrocatalysis: U.S. Pat. No. 4,793,904 teaches conversion of light hydrocarbons to synthesis gas using a solid electrolyte having a conductive metal or metal oxide coating on the cathode side which is capable of reducing oxygen to oxygen ions and a conductive coating on the anode side capable of catalyzing the oxidative conversion of methane or natural gas to synthesis gas with the solid electrolyte being a high ionic conductive material, preferably yttria or calcia stabilized zirconia, while also disclosing $Bi_2O_3$ stabilized by a lanthanide or calcium oxide; U.S. Pat. No. 4,933,054 teaches electrocatalytic oxidative conversion of saturated hydrocarbons to unsaturated hydrocarbons in an electrogenerative cell using a solid electrolyte having a conductive coating on each side, teaching the coating on the anode side may be bismuth and preferably mixtures of silver and bismuth, with the solid electrolyte being a high ionic conductive material, preferably yttria or calcia stabilized zirconia, while also disclosing $Bi_2O_3$ stabilized by a lanthanide or calcium oxide; U.S. Pat. No. 4,802,958 teaches electrocatalytic conversion of low molecular weight hydrocarbons to higher molecular weight hydrocarbons in an electrogenerative cell using a solid electrolyte coated with a metal or metal oxide coating on each side as taught in the '054 patent, the conductive metal or metal oxide coating on the cathode side being one capable of reducing oxygen to oxygen ions and the conductive metal or metal oxide coating on the anode side being capable of catalyzing the conversion of low molecular weight hydrocarbons to higher molecular weight hydrocarbons including bismuth oxide and preferably mixtures of bismuth oxide and silver; and U.S. Pat. No. 4,812,329 teaches a coating of oxygen-ionic-electronic conducting cerium and uranium oxide undoped or, preferably, doped with zirconia, thoria, or lanthanum oxides on cermet electrodes to provide electronic conduction for solid oxide electrochemical cells European Patent Publication No. 0 399 833 teaches multiphase mixtures of an electronically conductive material and an oxygen ion conductive material and solid membranes based upon $ABO_3$ perovskite materials, preferably containing small amounts or no bismuth.

Mixed ionic and electronic conducting oxidic materials based upon 25 to 98 mole percent cubic or tetragonal $ZrO_2$, 1.5 to 15 mole percent stabilizing oxide of alkaline earth metals, yttrium and/or rare earth metals, particularly oxides of Ca, Mg, Y, and 0.5 to 50 mole percent oxide V, Nb, Ta, Cr, Mb, W and/or Ti with usual impurities are taught by U.S. Pat. No. 4,931,214 to provide high current densities, operate at lower temperatures than present materials, provide conductivity independent of oxygen pressure and are useful in oxygen concentration cells, oxygen probes, fuel cells, and electrolysis cells. U.S. Pat. No. 3,956,194 teaches mixed electronic and ionic conductors for positive electrodes of electrochemical generators which are monophased graphite material having an alkali cation of Li, Na, K, Rb, Cs, or $NH_4$, a transition metal of Ti, V, Cr, Mn, Fe or Mo, and a non-metallic electronegative atom of O, S, F, Cl or Br.

SUMMARY OF THE INVENTION

This invention relates to composite materials having high oxygen ion and electronic ambipolar conductivity at desired process temperatures. Ambipolar conductivity, which has a strong influence on the rate of oxygen separation, depends upon the correct combination of ionic and electronic conductivity to result in high ambipolar conductivity, as more fully described in M. Liu, Electrode Kinetics and Transport Properties of Mixed Ionic-Electronic Conductors, Proceedings of the First International Symposium on Ionic and Mixed Conducting Ceramics, Edited by T. A. Ramanarayanan and H. L. Tuller, Proc. Vol. 91–12, 191–215, The Electrochemical Society, Pennington, N.J., (1991) incorporated herein in its entirety by reference.

Prior materials used in oxygen separation have been electrolyte materials, such as yttrium stabilized zirconia or ceria with $CaF_2$ fluorite structure, which are predominantly oxygen ion conductors. In electrolytes of such predominantly ionic conducting materials, oxygen transport takes place on the predominantly ionic conducting electrolyte while electrons move through an external electron circuit to maintain electrical neutrality. Thus, in addition to electrolyte materials such a prior device required two electrodes as well as an external connection between the electrodes, for example, porous platinum electrode layers and platinum wire leads, both operating at high temperatures. An oxygen semipermeation separation device according to the present invention based on a mixed ionic-electronic conducting composite membrane eliminates the two porous electrodes and external electron circuit.

It is one object of this invention to provide mixed oxygen ion and electronic conducting materials of composite non-homogeneous microstructure including a predominantly ionic conducting phase based upon cubic bismuth, cerium or zirconium oxides.

It is another object of this invention to provide mixed oxygen ion and electronic conducting materials of composite non-homogeneous microstructure including a predominantly electronic conducting phase based upon a metal of Group IB, IIB and VIII of the Periodic System of Elements, namely, Cu, Ag, Au, Zn, Cd, Hg, Fe, Ru, Os, Co, Rh, Ir, Ni, Pd and Pt.

It is still another object of this invention to provide a mixed oxygen ion and electronic conductor membrane for high efficiency separation of oxygen from mixed gases, such as air.

It is yet another object of this invention to provide a mixed oxygen ion and electronic conducting of composite non-homogeneous microstructure having high ambipolar conductivity for use in fuel cells, sensors, co-generation systems, electrosynthesis, and other solid state electrochemical processes utilizing mixed oxygen ion and electronic conduction.

Mixed oxygen ion and electronic conducting composite materials suitable for use in this invention have a non-homogeneous mixed microstructures of about 30 to about 90 volume percent predominantly oxygen ion conductor phase which may comprise $Bi_2O_3$-based, $CeO_2$-based, $ZrO_2$-based ionic conductor material and mixtures thereof and about 10 to about 70 volume percent predominantly electronic conductor metal phase which may be selected from Cu, Ag, Au, Zn, Cd, Hg, Fe, Ru, Os, Co, Rh, Ir, Ni, Pd and Pt, preferably silver, palladium and silver-palladium alloy. The predominantly oxygen ion conducting phase is a solid solution comprising about 20 to about 98 mol % of $Bi_2O_3$, $CeO_2$ or $ZrO_2$ and mixtures thereof and about 1 to about 50 mol % of a stabilizing oxide selected from alkaline earth metal oxides and rare earth metal oxides.

The typical ionic conductivity for a mixed ionic-electronic conducting material according to this invention having a bismuth oxide ionic conducting phase and a silver electronic conducting phase has been found to be about 0.25 S/cm at 750° C. in air, while its electronic conductivity is about $10^5$ S/cm at room temperature in air. An oxygen separation cell using a 90 micron thick membrane of this mixed conductor showed a 370 mA/cm$^2$ oxygen semipermeation current rate under 180 mV driving force at 750° C.

The typical ionic conductivity for a mixed ionic-electronic conducting material according to this invention having a cerium oxide ionic conducting phase and a palladium electronic conducting phase has been found to be about 0.19 S/cm at 1000° C. in air, while its electronic conductivity is about $4 \times 10^4$ S/cm at room temperature in air. An oxygen separation cell using a 90 micron thick membrane of this mixed conductor showed a 450 mA/cm$^2$ oxygen semipermeation current rate under a 180 mV driving force at 1000° C.

The typical ionic conductivity for mixed ionic-electronic conducting material according to this invention having a zirconium oxide ionic conducting phase and a palladium electronic conducting phase has been found to be about 0.09 S/cm at 1000° C. in air, while its electronic conductivity is about $4 \times 10^4$ S/cm at room temperature in air. An oxygen separation cell using a 90 micron thick membrane of this mixed conductor showed a 320 mA/cm$^2$ oxygen semipermeation current rate under a 180 mV driving force at 1000° C.

The mixed oxygen ion and electronic conducting composite materials of this invention may be fabricated into gas impervious membranes for oxygen ion transport. These mixed oxygen ion and electronic conducting gas impervious membranes have high ambipolar conductivity for oxygen ion transport and are useful for oxygen separation from an oxygen containing gas by contacting one side of the membrane with an oxygen containing gas concurrently with withdrawing oxygen from the second opposite side of the membrane. Oxygen separation from gas mixtures using mixed oxygen ion and electronic conducting composite membranes of this invention can be achieved at relatively low pressure differentials and intermediate temperatures providing enhanced separation efficiency and reduced operating costs. High ambipolar conductivity and high catalytic activity of these materials render them especially suitable for catalysis of electrochemical reactions, electrosynthesis and electrolysis applications.

BRIEF DESCRIPTION OF THE DRAWINGS

The above and further objects and advantages of the invention will become apparent upon reading the detailed description of preferred embodiments and reference to the drawings, wherein.

DESCRIPTION OF PREFERRED EMBODIMENTS

Figure 1:
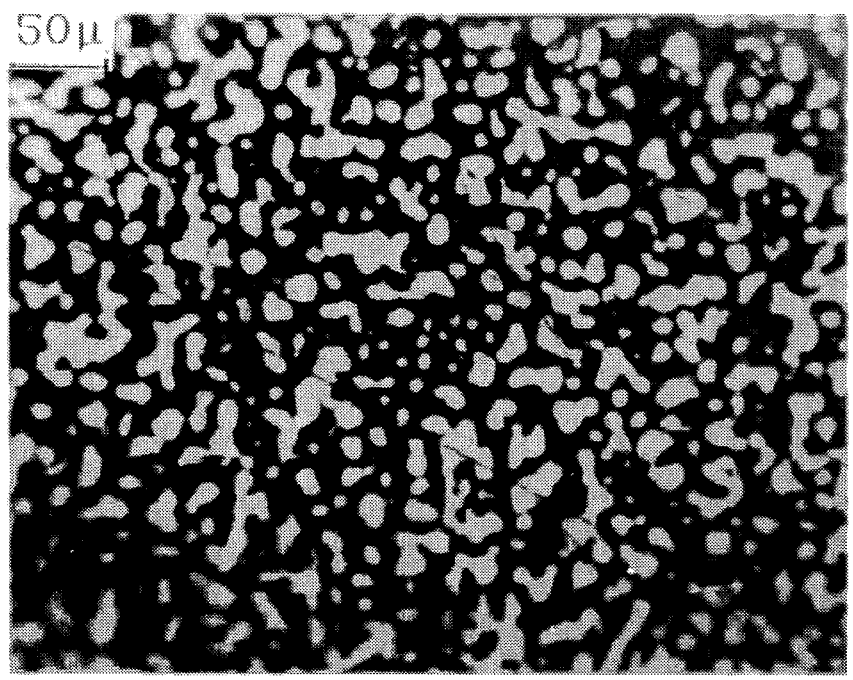
FIG. 1 is a photomicrograph of the non-homogeneous mixed microstructure of material prepared in Example II, Sample D, showing typical morphology of materials of this invention.

Mixed oxygen ion and electronic conducting materials resulting from combination of materials having oxygen ion and electronic conductivity in a manner which results in high ambipolar conductivity at desired process temperatures are achieved by this invention. The ambipolar conductivity, or the ambipolar diffusivities of oxygen in the mixed oxygen ion and electronic conducting bismuth, cerium and zirconium oxides based materials of this invention are more than two times, and generally more than ten or a hundred times, greater than mixed oxygen ion and electronic conductors reported in the prior literature. The ambipolar conductivity in $Ohm^{-1}cm^{-1}$ at 750° C. for bismuth oxide based $(Bi_{1.5}Y_{0.5}O_3)_{65vol\%}(Ag)_{35vol\%}$ is about 0.25, for cerium oxide based $[(CeO_2)_{88mol\%}(CaO)_{12mol\%}]_{65vol\%}[Pd]_{35vol\%}$ is about 0.19 at 1000° C., and for zirconium oxide based $[(ZrO_2)_{92mol\%}(Y_2O_3)_{8mol\%}]_{65vol\%}[Pd]_{35vol\%}$ is about 0.09 at 1000° C. The ambipolar conductivities for these materials were calculated according to $\sigma_{amb} \approx (\sigma_{ion}\sigma_e)/(\sigma_{ion}+\sigma_e) \approx \sigma_{ion}$ when $\sigma_{ion} \ll \sigma_e$.

Suitable mixed ionic and electronic conducting metal oxide based materials having high ambipolar conductivity according to this invention include non-homogeneous mixed microstructure materials of about 30 to about 90, preferably about 60 to about 80, volume percent predominantly ion conducting metal oxide phase and about 10 to about 70, preferably about 20 to about 40, volume percent predominantly electronic conducting metal, metal oxide and perovskite-type metal oxide phase.

Suitable oxygen ion conducting metal oxide phase materials include cubic bismuth-, cerium- and zirconium- based oxides. The oxygen ion conducting metal oxide phase comprises about 20 to about 98 mol %, preferably about 60 to about 80 mol %, cubic bismuth-, cerium-, or zirconium-oxide and about 1 to about 50 mol % of an oxide stabilizer of a rare earth metal or alkaline earth metal oxide, preferably yttrium oxide or calcium oxide, calcium oxide being particularly preferred for stabilizing cerium oxide and yttrium oxide being particularly preferred for stabilizing bismuth or zirconium oxide. Preferred stabilizers include yttrium oxide, calcium oxide, erbium oxide, gadolinium oxide, ytterbium oxide, neodynium oxide and mixtures thereof. It is preferred that about 10 to about 50 mol % stabilizer be used with the bismuth oxide phase and about 5 to about 30 mol % stabilizer be used with the cerium oxide and zirconium oxide phase. In addition to its stabilizing function, the stabilizers also provide enhanced ionic and electronic conductivities to the primarily ionic conductive phase.

Other predominantly ionic conducting solid solutions may be used as the ionic conducting phase in this invention. For example, calcium oxide and/or yttrium oxide doped thorium oxide, beta-alumina, as well as other ionic conductors including proton ion conductors, silver ion conductors, sodium ion conductors, lithium ion conductors, copper ion conductors, fluoride ion conductors, and the like, may be used.

The predominantly electronic conductive phase is preferably a metal selected from Cu, Ag, Au, Zn, Cd, Hg, Ge, Ru, Os, Co, Rh, Ir, Ni, Pd, Pt and mixtures thereof, preferably Ag, Pd and Ag/Pd alloys. When the amount of the predominantly electronic conductive phase is about 20 to 35 vol % and higher, the phase is continuous allowing the ratio of ionic to electronic conductivity of the mixed composite of this invention to be adjusted to any desired value from zero to unity by changing the amount of the predominantly electronic conductive phase. The predominantly electronic conductive phase may also be an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_3$, wherein y is a numeral of about 0.40 to 2.0 and M is selected from Cu, Ti, Vn, Cr, Mn, Fe, Co, Ni and mixtures thereof; or an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number of 0 to a positive or negative number of about 0.3 to satisfy valence requirements. By the terminology "derivative forms" we include the above perovskite materials which have been modified by adding a small amount of additional additives or dopants while maintaining the original structure. In preferred embodiments, z is a positive numeral of about 0.05 to about 0.2 and w is a positive numeral of about 0.05 to about 0.2.

The microstructure of the composite non-homogeneous mixed material should have uniform distribution of the two phases, one being predominantly oxygen ion conductive and the other being predominantly electronically conductive. The predominantly electronic conducting phase may have small agglomerates present. The two phases are desirably substantially chemically inert to each other and no other phases are present at the phase boundaries or elsewhere in the composite. FIG. 1 is a photomicrograph of a typical mixed microstructure according to this invention of $(Bi_{1.5}Y_{0.5}O_3)_{65vol.\%}Ag_{35vol.\%}$ sintered at 900° C. showing the bismuth oxide based matrix phase as dark and the silver phase as light.

The ionic conducting phase of the mixed conductor of this invention is continuous. The electronic conducting phase of the mixed conductor of this invention is continuous when the volume percentage of that phase in the mixed conductor exceeds a specific amount for the particular system. Three dimensional photomicrographs are necessary to show whether the electronic conducting phase is continuous. We have found that with a $Bi_{1.5}Y_{0.5}O_3$ system Ag obtains a continuous phase at about 20 to about 35 volume percent while Ag/Pd alloys obtain a continuous phase at slightly higher amounts. The poor wettability between the electronic conducting phase and the ionic conducting phase enhances formation of parallel two phase microstructures, avoiding the ionic block effect. As the Examples below show, mixed conductivity occurs when the electronic conducting phase is continuous. However, to obtain desired high ambipolar conductivity, it is preferred that the electronic conducting phase be present in slightly greater amount than necessary for obtaining a continuous electronic conducting phase, about 1 to about 5 volume percent greater being preferred.

The composite materials of this invention may be produced by various methods known to the art. One method of production, for example, is mixing desired proportions of oxide of bismuth and oxide of yttrium and calcining at sufficiently high temperature and for sufficient time to obtain yttria-stabilized bismuth oxides which may be verified by x-ray diffraction. The yttria-stabilized bismuth oxides calcined powder is mixed with the desired volume percentage of silver powder and ball-milled down to a particle size of about 0.5 to about 1 micron. A slurry is formed to which organic binder may be added and mixed by milling followed by drying. The powder may be screened through a #60 mesh screen and formed into desired shape by pressing. Another method is to tape cast the slurry of fine ceramic powder into films or membranes. The green material is then sintered in air at a sufficiently high temperature and for a sufficiently long time to result in a density of greater than about 95% of the theoretical value to avoid appreciable passage of molecular sized material through the membrane. The mixed oxygen ion and electron conducting gas impervious membranes of this invention may also be produced by chemical vapor deposition, electrochemical vapor deposition, sol-gel processing, precipitation processing, or by other suitable processes.

Mixed oxygen ion and electron conducting gas impervious membranes having a thickness of about 1 to about 2000 microns, preferably about 1 to about 1000 microns and most preferably about 1 to about 50 microns, may be formed having the non-homogeneous microstructure described above. By the term "membranes" we mean to include a variety of forms, such as, thin sheets, wafers, and the material formed into any desired shape, such as pellets, tubes, honeycombs, and the like for use in a wide variety of apparatus for oxygen separation and for catalysis.

When the composite mixed ionic-electronic conducting materials of this invention are used for electrolytes in pressure activated oxygen separation devices, the oxygen transport, by oxygen permeation from the cathode side to the anode side of the mixed conducting electrolyte, has been recorded after an oxygen partial pressure gradient has been built up across the mixed conducting electrolyte. Higher oxygen exchange current density will be achieved when the thickness of the mixed conducting electrolyte is reduced and the electrocatalysis is improved. Therefore, electrolytes produced from mixed ionic-electronic conducting of the present invention produce a substantially more uninhibited incorporation and transport of oxygen ions from the cathode side to the anode and release of oxygen from the anode side of the mixed conducting electrolyte while electrons are spontaneously transported from the anode to the cathode side of the electrolyte without an external electrical circuit. When the mixed ionic-electronic conducting material of this invention is used as an electrode in an electrochemical device, the incorporation of oxygen and electron exchange can take place on any boundaries between the two phase, solid mixed conductor and gas, contact areas. In comparison, in electronic conducting electrodes commonly used the charge transfer only takes place on the uni-dimensional boundary areas of the three phase contact of ionic conductor, electronic conductor, and gas. This offers advantages in use of the composite ionic-electronic conductors of this invention for oxygen exchange reactions, such as, in oxygen concentration cells, oxygen fuel cells, and electrolysis cells.

Since the incorporation of oxygen is catalytically activated by the introduction of electronic conduction in the electrolyte according to the present invention, the kinetics of oxygen reduction and evolution at the surfaces of the mixed ionic-electronic conducting electrolyte are even more favorable in comparison with the most commonly used expensive porous platinum which is often used as an electrode material in oxygen separation devices or other electrochemical devices where zirconium oxide or cerium oxide have been used as electrolytes. Using the mixed ionic-electronic conducting composite bismuth oxide based electrolyte of this invention, oxygen sensors, fuel cells, and electrolysis cells can be operated at lower temperatures than those previously required.

Oxygen permeation and oxygen separation rate from a mixed gas containing oxygen by a mixed oxygen ion and electronic conducting membrane can be computed from measurements obtained using an apparatus and method as more fully described in U.S. Pat. No. 5,273,628, which has been incorporated herein by reference.

The mixed oxygen ion and electronic conducting membrane according to this invention may be used in catalysis of wide variety of chemical reactions involving the removal of oxygen ions from material on one side of the membrane and provision of oxygen ion to a different material of the other side of the membrane. In addition, the membranes of this invention may be used in conjunction with other structures, such as coatings and the like for electrodes in electrochemical and electrolysis reactions. The membranes according to this invention may be coated on either or both sides with a suitable electrocatalyst to aid in the desired electrochemical reactions. For example, a thin coating of a catalyst for oxygen reduction as known to the art may be applied to the side of the membrane in contact with compressed air and a thin coating of a catalyst for oxygen evolution or fuel oxidation may be applied to the opposite side to enhance a desired oxidative chemical reaction in the presence of a chemical reactant. Contacting the faces of the membrane with the desired gas reactants may be achieved in any manner known to the art for contacting each side of the membrane with a different gas.

The following examples are set forth with specific materials and process conditions to specifically exemplify the invention and should not limit the invention in any way.

Example I

A mixed microstructure ionic-electronic conductive composite material according to this invention having the formula $(Bi_{1.5}Y_{0.5}O_3)_{65vol\%}(Ag_{70wt\%}Pd_{30wt\%})_{35vol\%}$ was prepared by first preparing yttria stabilized bismuth oxide by mixing 86.10 weight % bismuth oxide powder with particle size of 1 to 40 microns (99.99% $Bi_2O_3$, Aldrich, Milwaukee, Wis.) with 13.90 weight % yttrium oxide powder with particle size 1 to 40 microns (99.99% $Y_2O_3$, Alrich, Milwaukee, Wis.) and grinding with 2 weight % of a commercial disperser (Colloid #261, Rhone-Porlene, Marietta, Ga.) in an attrition mill for about 24 hours in a methanol solution. The slurry was dried in air at 70° C. and passed through 200 micron mesh sieve following which the powder was calcined at 750° C. in air for 10 hours to obtain the desired solid solution and crystal structure. The calcined solid solution powder was mixed with 41.56 weight % $Ag_{70wt\%}Pd_{30wt\%}$ alloy powder and ground with 2 weight % of Colloid #261 disperser in a methanol solution for 24 hours. During the last 1 hour of milling 1.5 weight % of a commercial organic binder (XUS, Dow Chemical U.S.A., Freeport, Tex.) was added to the slurry. The slurry was dried in air at 70° C. and was passed through a 200 micron mesh size sieve. The powder was isostatically pressed for 30 seconds at a pressure of 30,000 psi. The green density was 60% of the theoretical density. The samples were sintered in air at 900° C. for 5 hours and the finished plates had a diameter of 25 mm and thickness of 1.5 mm.

Prior to carrying out electrical and electrochemical measurements of conductivity, oxygen semipermeation rate and ionic transference number, silver paste (99.9%, Heraeus Cermall, West Cmshohocken, Pa.) was amplied to the surfaces of the plates and heated up to 70° C. for 1 hour to remove organic solvents in the paste and the temperature then raised to 750° C. at a ramp rate of 100° C. per hour and held at 750° C. for 2 hours to burn organic binders out of the paste.

The density of the formed composite body was measured by the Archimedes method. The phases of the formed composite body were identified by XRD at room temperature. The microstructures of the formed composite body were analyzed by optical microscope.

The impedance was measured by a two probe AC complex impedance technique. Oxygen permeation rate was measured in an oxygen concentration cell as more fully described in U.S. Pat. No. 5,273,628, which is incorporated herein by reference in its entirety. The ionic transference number was measured in an oxygen concentration cell by the electromotive force technique as described by C. Wagner, Z. Phy. Chem., 21, 25, (1925), which is incorporated herein by reference in its entirety.

The results of the above measurements were similar to the results of the following examples.

Figure 5:
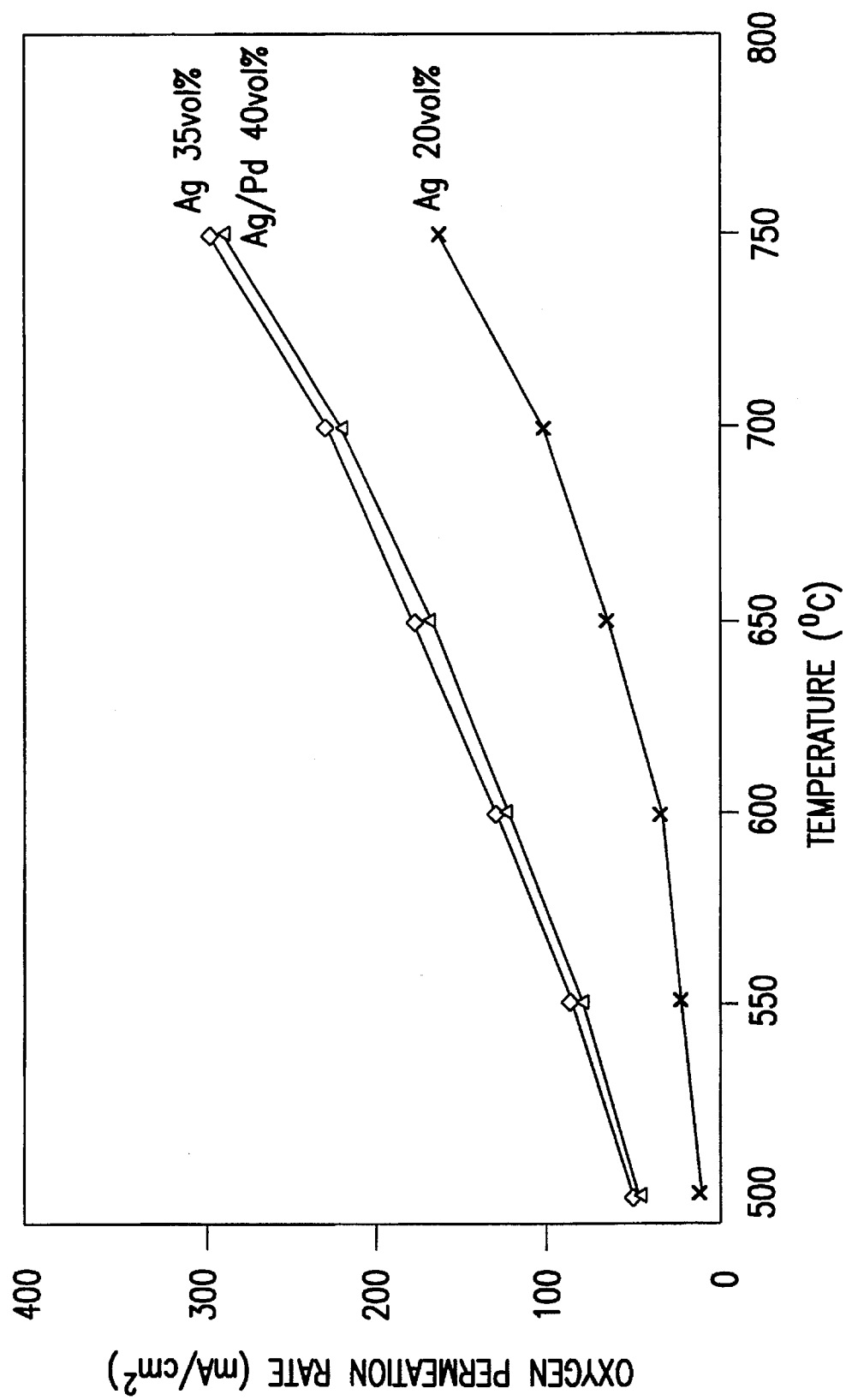
FIG. 5 is a graph showing oxygen permeation rate as a function of temperature for $(Bi_{1.5}Y_{0.5}O_3)_{60vol\%}(Ag_{70wt\%}Pd_{30wt\%})_{40vol\%}$ prepared as described in Example I and for Samples B and D of Example II.

A sample was prepared as described above having the formula $(Bi_{1.5}Y_{0.5}O_3)_{60vol\%}(Ag_{70wt\%}Pd_{30wt\%})_{40vol\%}$ and its oxygen permeation rate was measured as a function of temperature as shown in FIG. 5.

Example II

The following six mixed ionic-electronic conducting composite ceramic materials were fabricated:

| | |
|---|---|
| A | $(Bi_{1.5}Y_{0.5}O_3)_{90vol\%}Ag_{10vol\%}$ |
| B | $(Bi_{1.5}Y_{0.5}O_3)_{80vol\%}Ag_{20vol\%}$ |
| C | $(Bi_{1.5}Y_{0.5}O_3)_{70vol\%}Ag_{30vol\%}$ |
| D | $(Bi_{1.5}Y_{0.5}O_3)_{65vol\%}Ag_{35vol\%}$ |
| E | $(Bi_{1.5}Y_{0.5}O_3)_{60vol\%}Ag_{40vol\%}$ |
| F | $(Bi_{1.5}Y_{0.5}O_3)_{50vol\%}Ag_{50vol\%}$ |

The following powders were ground in the required weight ratios for 24 hours in an attrition mill in the presence of methanol and treated as described in Example I to obtain green composite bodies having diameters of 24 mm and thickness of 1.5 mm.

| | | |
|---|---|---|
| A | 86.9 weight % $Bi_{1.5}Y_{0.5}O_3$ | 13.1 weight % $Ag_2O$ |
| B | 74.6 weight % $Bi_{1.5}Y_{0.5}O_3$ | 25.4 weight % $Ag_2O$ |
| C | 63.2 weight % $Bi_{1.5}Y_{0.5}O_3$ | 36.8 weight % $Ag_2O$ |
| D | 57.7 weight % $Bi_{1.5}Y_{0.5}O_3$ | 42.3 weight % $Ag_2O$ |
| E | 52.7 weight % $Bi_{1.5}Y_{0.5}O_3$ | 47.5 weight % $Ag_2O$ |
| F | 42.4 weight % $Bi_{1.5}Y_{0.5}O_3$ | 57.6 weight % $Ag_2O$ |

The green samples A–F were fired at 900° C. in air for 5 hours. The theoretical densities were obtained from measured x-ray diffraction patterns and measured densities obtained by the Archimedes method.

| | Measured Density (g/cm³) | Theoretical Density (g/cm³) |
|---|---|---|
| A | 8.17 | 8.52 |
| B | 8.29 | 8.74 |
| C | 8.53 | 8.96 |
| D | 8.74 | 9.07 |
| E | 8.76 | 9.18 |
| F | 9.01 | 9.40 |

The ionic transference numbers ($t_i$) of the mixed ionic-electronic conductive composites were measured at the indicated temperatures using the oxygen concentration cell: $O_2(P=1.0 \text{ atm.})/\text{sample}/O_2(P=0.21 \text{ atm.})$

| | Temperature (°C.) | | | |
|---|---|---|---|---|
| | 750 | 700 | 600 | 500 |
| A | 0.93 | 0.93 | 0.93 | 0.92 |
| B* | 0.93 | 0.93 | 0.92 | 0.87 |
| C* | 0.91 | 0.92 | 0.91 | 0.80 |
| D, E & F | Approximately 0 - electronic conducting phase is continous. | | | |

*The materials showed approximately zero ionic transference number when the materials have the much finer grain microstructure.

Sample D was polished to a submicron finish and a photomicrograph at 200× magnification is shown in FIG. 1. Other samples according to the present invention have the same morphology.

Figure 2:
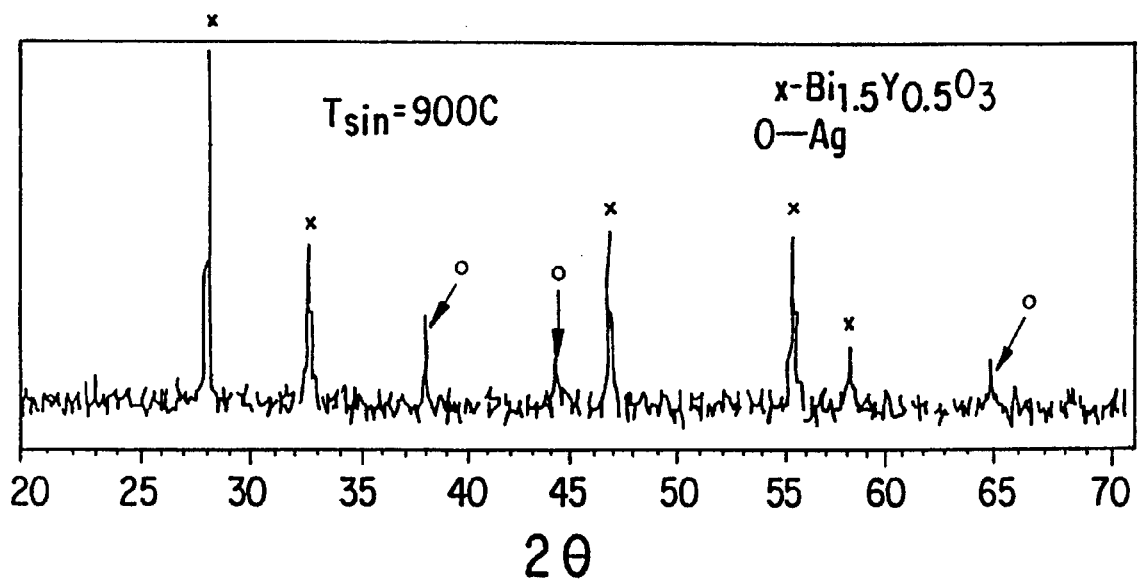
FIG. 2 is a x-ray diffraction pattern of material shown in FIG. 1 showing a cubic phase and a metal phase.

The x-ray diffraction pattern of Sample D, shown in FIG. 2, was obtained by scanning at room temperature at a 2°/min speed (Cu, $K_\alpha$). A cubic phase as well as a metal phase is shown in FIG. 2. Other samples according to this invention show similar x-ray diffraction patterns showing a cubic phase and a metal phase.

Figure 3A:
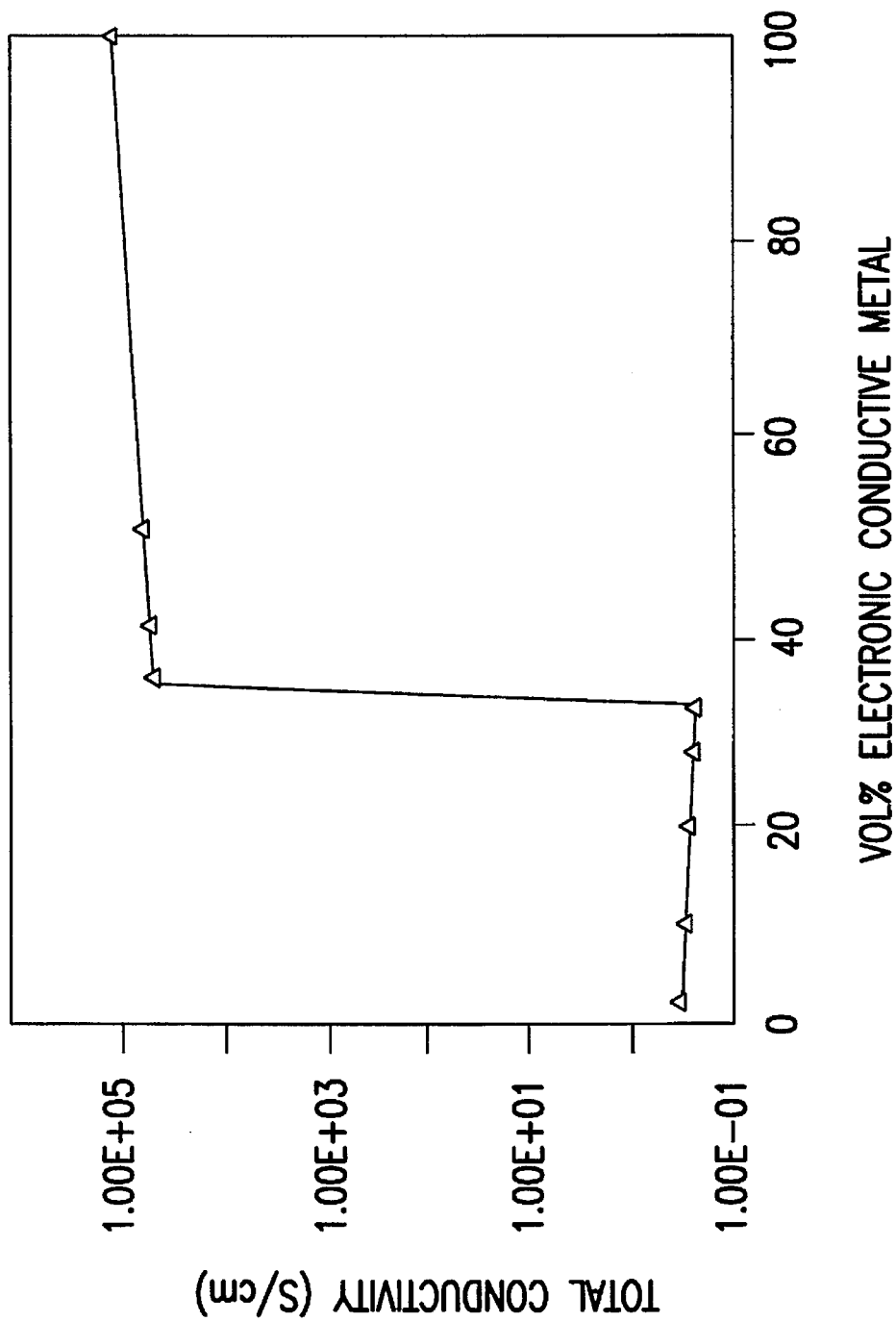
FIGS. 3A–C are graphs of total conductivity measurements of Samples A–D of Example II, Example III and Example IV, respectively, measured in air at the temperature set forth in the Example.

Total conductivity measurements of Samples A–D as a function of vol % Ag measured in air at 750° C. are shown in FIG. 3A.

Figure 4:
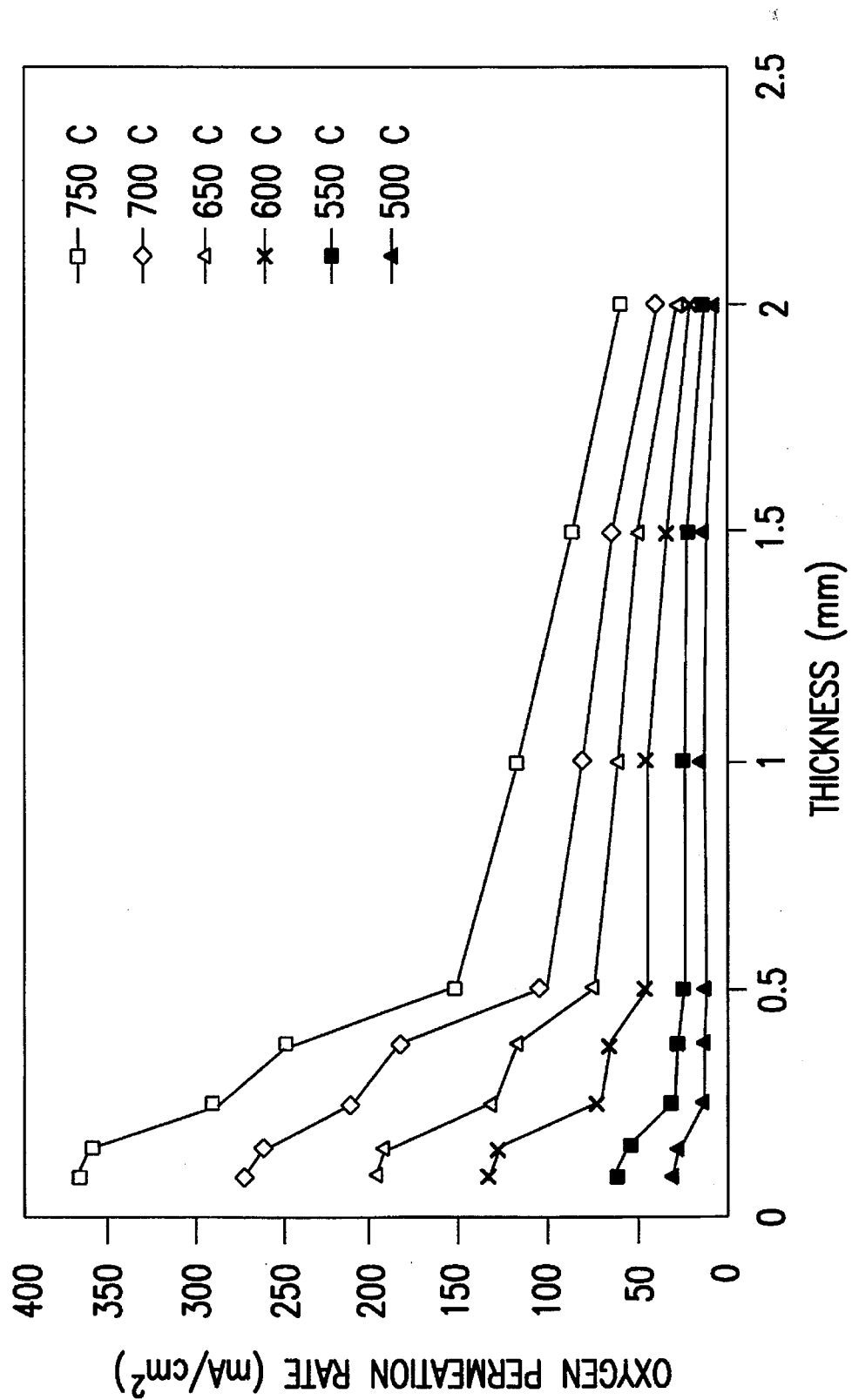
FIG. 4 is a graph showing oxygen permeation rate as a function of thickness for Sample D of Example II at the indicated temperatures.

Oxygen permeation rates as a function of thickness of Sample D over a temperature range of 500° to 750° C. were made using an oxygen concentration cell:

$O_2(P_{O2}=0.21 \text{ atm})$, Ag/Sample/Ag,$O_2(P_{O2}=6\times10^{-5} \text{ atm})$ are shown in FIG. 4. Oxygen permeation rates as a function of temperature of Samples B and D are shown in FIG. 5. It is seen that oxygen permeation rate increases as the electronic conducting phase becomes continuous whereas the ionic conductivity remains almost constant. FIG. 5 also shows that the oxygen permeation rate of the Ag/Pd alloy containing sample having the electronic conducting phase greater than necessary for obtaining a continuous phas is slightly lower.

EXAMPLE III

The following six mixed ionic-electronic conducting composite ceramic materials were fabricated:

| | |
|---|---|
| A | $[(CeO_2)_{88mol\%}(CaO)_{12mol\%}]_{90vol\%}[Pd]_{10vol\%}$ |
| B | $[(CeO_2)_{88mol\%}(CaO)_{12mol\%}]_{80vol\%}[Pd]_{20vol\%}$ |
| C | $[(CeO_2)_{88mol\%}(CaO)_{12mol\%}]_{70vol\%}[Pd]_{30vol\%}$ |
| D | $[(CeO_2)_{88mol\%}(CaO)_{12mol\%}]_{65vol\%}[Pd]_{35vol\%}$ |
| E | $[(CeO_2)_{88mol\%}(CaO)_{12mol\%}]_{60vol\%}[Pd]_{40vol\%}$ |
| F | $[(CeO_2)_{88mol\%}(CaO)_{12mol\%}]_{50vol\%}[Pd]_{50vol\%}$ |

The following powders were ground in the required weight ratios for 24 hours in an attrition mill in the presence of methanol and treated as described in Example I to obtain green composite bodies having diameters of 24 mm and thickness of 1.5 mm.

| | | |
|---|---|---|
| A | 81.35 weight % $(CeO_2)_{88mol\%}(CaO)_{12mol\%}$ | 18.67 weight % Pd |
| B | 65.94 weight % $(CeO_2)_{88mol\%}(CaO)_{12mol\%}$ | 34.06 weight % Pd |
| C | 53.04 weight % $(CeO_2)_{88mol\%}(CaO)_{12mol\%}$ | 46.96 weight % Pd |
| D | 47.34 weight % $(CeO_2)_{88mol\%}(CaO)_{12mol\%}$ | 52.66 weight % Pd |
| E | 42.06 weight % $(CeO_2)_{88mol\%}(CaO)_{12mol\%}$ | 57.93 weight % Pd |
| F | 32.62 weight % $(CeO_2)_{88mol\%}(CaO)_{12mol\%}$ | 67.39 weight % Pd |

The green samples A–F were fired at 1450° C. in air for 5 hours. The theoretical densities were obtained from measured x-ray diffraction patterns and measured densities obtained by the Archimedes method.

| | Measured Density (g/cm³) | Theoretical Density (g/cm³) |
|---|---|---|
| A | 7.09 | 7.39 |
| B | 7.79 | 8.10 |
| C | 8.34 | 8.82 |

-continued

|   | Measured Density (g/cm$^3$) | Theoretical Density (g/cm$^3$) |
|---|---|---|
| D | 8.77 | 9.17 |
| E | 9.15 | 9.53 |
| F | 9.87 | 10.24 |

The ionic transference numbers ($t_i$) of the mixed ionic-electronic conductive composites were measured at the indicated temperatures using the oxygen concentration cell:

$O_2(P_{O2}=1.0 \text{ atm.})/\text{sample}/O_2(P_{O2}=0.21 \text{ atm.})$

|   | Temperature (°C.) | | | |
|---|---|---|---|---|
|   | 1000 | 900 | 800 | 700 |
| A | 0.90 | 0.91 | 0.92 | 0.93 |
| B* | 0.90 | 0.91 | 0.92 | 0.94 |
| C* | 0.89 | 0.90 | 0.91 | 0.91 |
| D, E & F | Approximately 0 - electronic conducting phase is continuous. | | | |

*The materials show approximately zero ionic transference number when the materials have much finer grain microstructure.

Figure 3B:
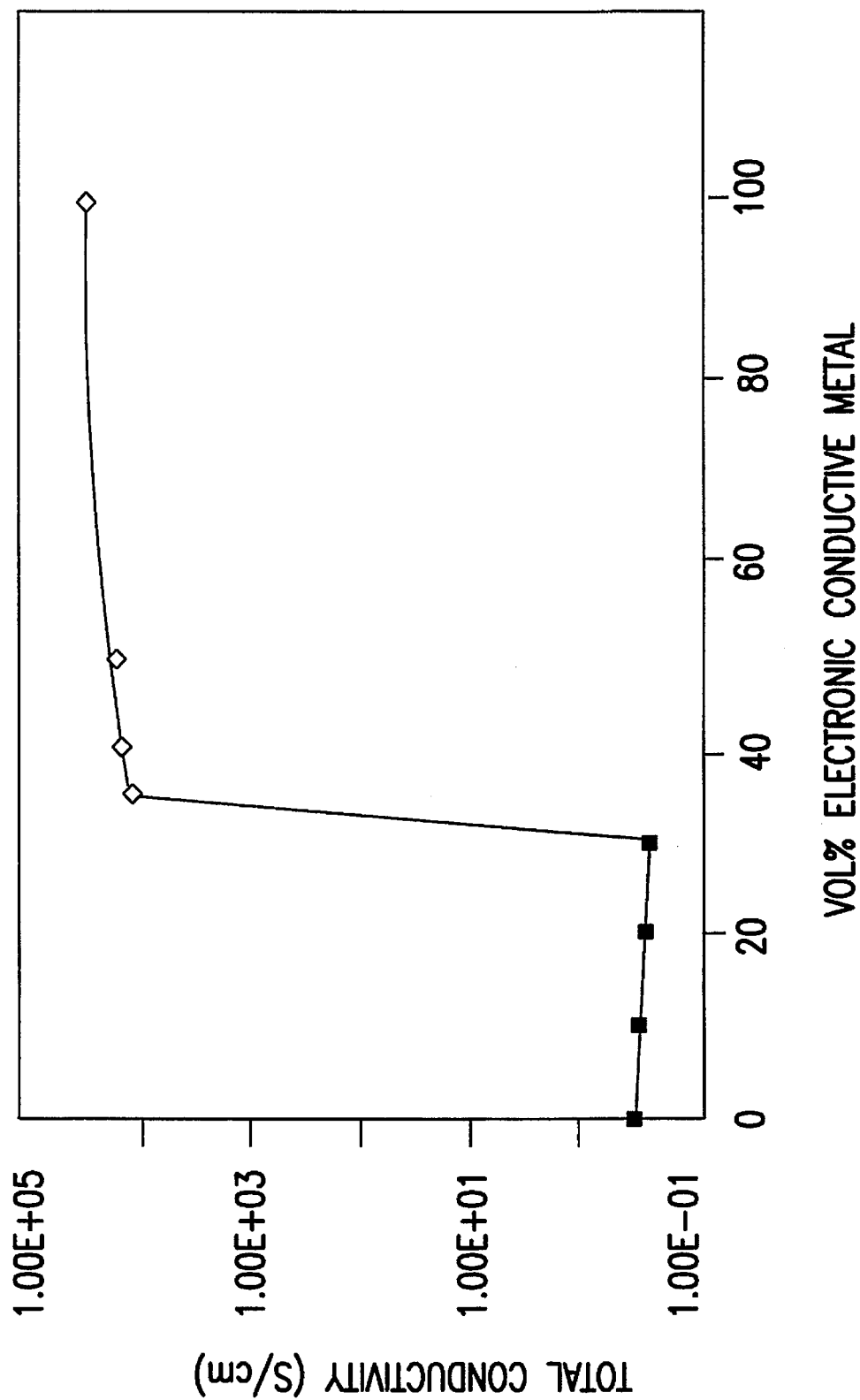

Total conductivity measurements of Samples A–F as a function of vol % Pd measured in air at 1000° C. are shown in FIG. 3B.

Figure 6:
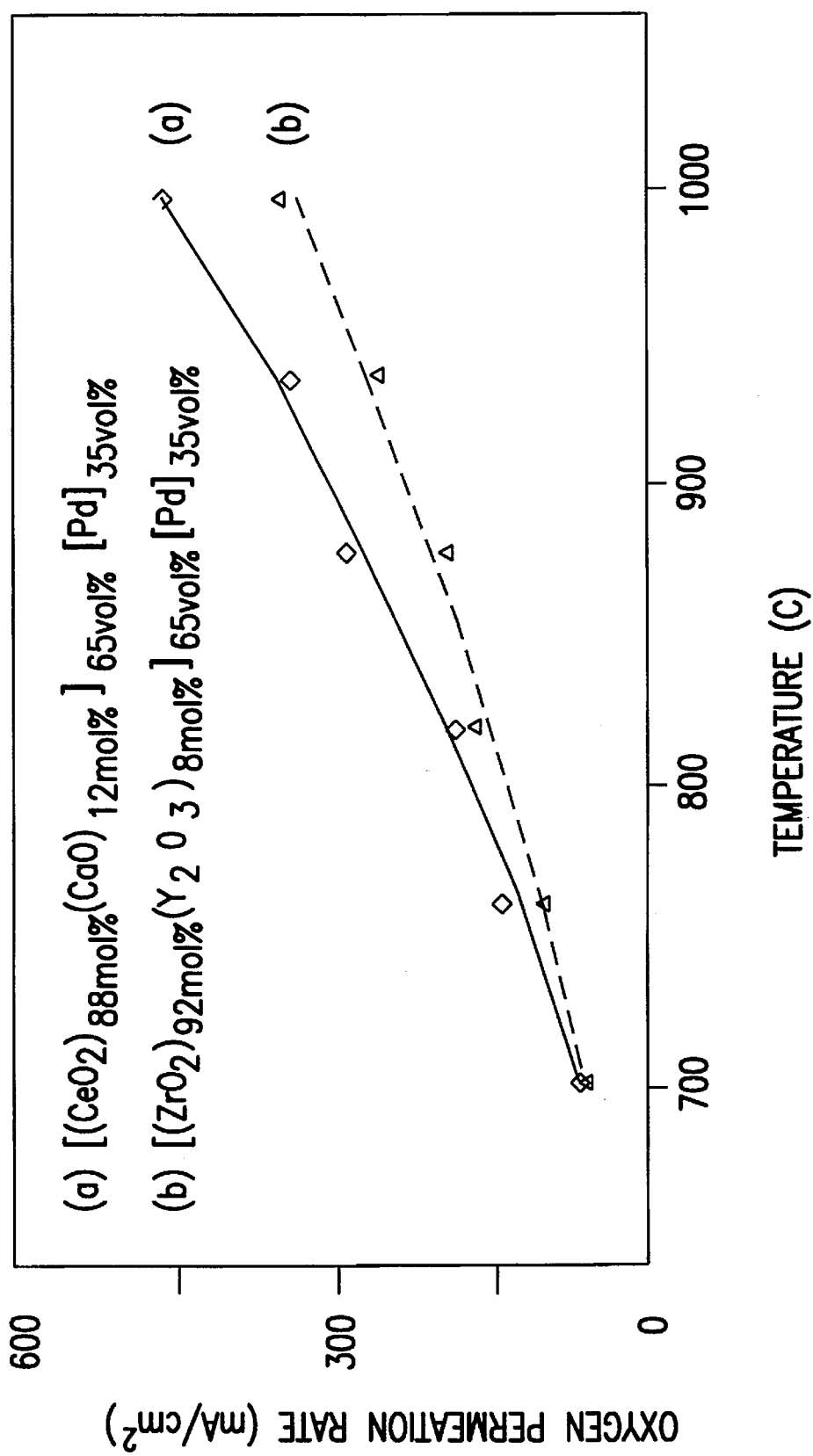
FIG. 6 is a graph showing oxygen permeation rate as a function of temperature for Sample D of Example III and Sample D of Example IV.

Oxygen permeation rates were carried out for Sample D using the same oxygen concentration cell $O_2(P_{O2}=0.21 \text{ atm})$, Pt/Sample/Pt, $O_2(P_{O2}=6\times10^{-5} \text{ atm})$ over a temperature range of 700° to 1000° C. and are shown in FIG. 6.

Example IV

The following six mixed ionic-electronic conducting composite ceramic materials were fabricated:

| A | $[(ZrO_2)_{92mol\%}(Y_2O_3)_{8mol\%}]_{90vol\%}[Pd]_{10vol\%}$ |
| B | $[(ZrO_2)_{92mol\%}(Y_2O_3)_{8mol\%}]_{80vol\%}[Pd]_{20vol\%}$ |
| C | $[(ZrO_2)_{92mol\%}(Y_2O_3)_{8mol\%}]_{70vol\%}[Pd]_{30vol\%}$ |
| D | $[(ZrO_2)_{92mol\%}(Y_2O_3)_{8mol\%}]_{65vol\%}[Pd]_{35vol\%}$ |
| E | $[(ZrO_2)_{92mol\%}(Y_2O_3)_{8mol\%}]_{60vol\%}[Pd]_{40vol\%}$ |
| F | $[(ZrO_2)_{92mol\%}(Y_2O_3)_{8mol\%}]_{50vol\%}[Pd]_{50vol\%}$ |

The following powders were ground in the required weight ratios for 24 hours in an attrition mill in the presence of methanol and treated as described in Example I to obtain green composite bodies having diameters of 24 mm and thickness of 1.5 mm.

| A | 79.37 weight % $(ZrO_2)_{92mol\%}(Y_2O_3)_{8mol\%}$ | 20.63 weight % Pd |
| B | 63.10 weight % $(ZrO_2)_{92mol\%}(Y_2O_3)_{8mol\%}$ | 36.90 weight % Pd |
| C | 50.00 weight % $(ZrO_2)_{92mol\%}(Y_2O_3)_{8mol\%}$ | 50.00 weight % Pd |
| D | 44.26 weight % $(ArO_2)_{92mol\%}(Y_2O_3)_{8mol\%}$ | 55.74 weight % Pd |
| E | 39.06 weight % $(ZrO_2)_{92mol\%}(Y_2O_3)_{8mol\%}$ | 60.94 weight % Pd |
| F | 29.92 weight % $(ZrO_2)_{92mol\%}(Y_2O_3)_{8mol\%}$ | 70.08 weight % Pd |

The green Samples A–F were fired at 1450° C. in air for 5 hours. The theoretical densities were obtained from measured x-ray diffraction patterns and measured densities obtained by the Archimedes method.

|   | Measured Density (g/cm$^3$) | Theoretical Density (g/cm$^3$) |
|---|---|---|
| A | 6.36 | 6.69 |
| B | 7.13 | 7.48 |
| C | 7.87 | 8.27 |
| D | 8.32 | 8.67 |
| E | 8.68 | 9.07 |
| F | 9.38 | 9.85 |

The ionic transference numbers ($t_i$) of the mixed ionic-electronic conductive composites were measured at the indicated temperatures using the oxygen concentration cell: $O_2(P=1.0 \text{ atm.})/\text{sample}/O_2(P=0.21 \text{ atm.})$

|   | Temperature (°C.) | | | |
|---|---|---|---|---|
|   | 1000 | 900 | 800 | 700 |
| A | 0.92 | 0.93 | 0.94 | 0.95 |
| B* | 0.92 | 0.92 | 0.93 | 0.95 |
| C* | 0.91 | 0.92 | 0.93 | 0.91 |
| D, E & F | Approximately 0 - electronic conducting phase is continuous. | | | |

*The materials show approximately zero ionic transference number when the materials has much finer grain microstructure.

Figure 3C:
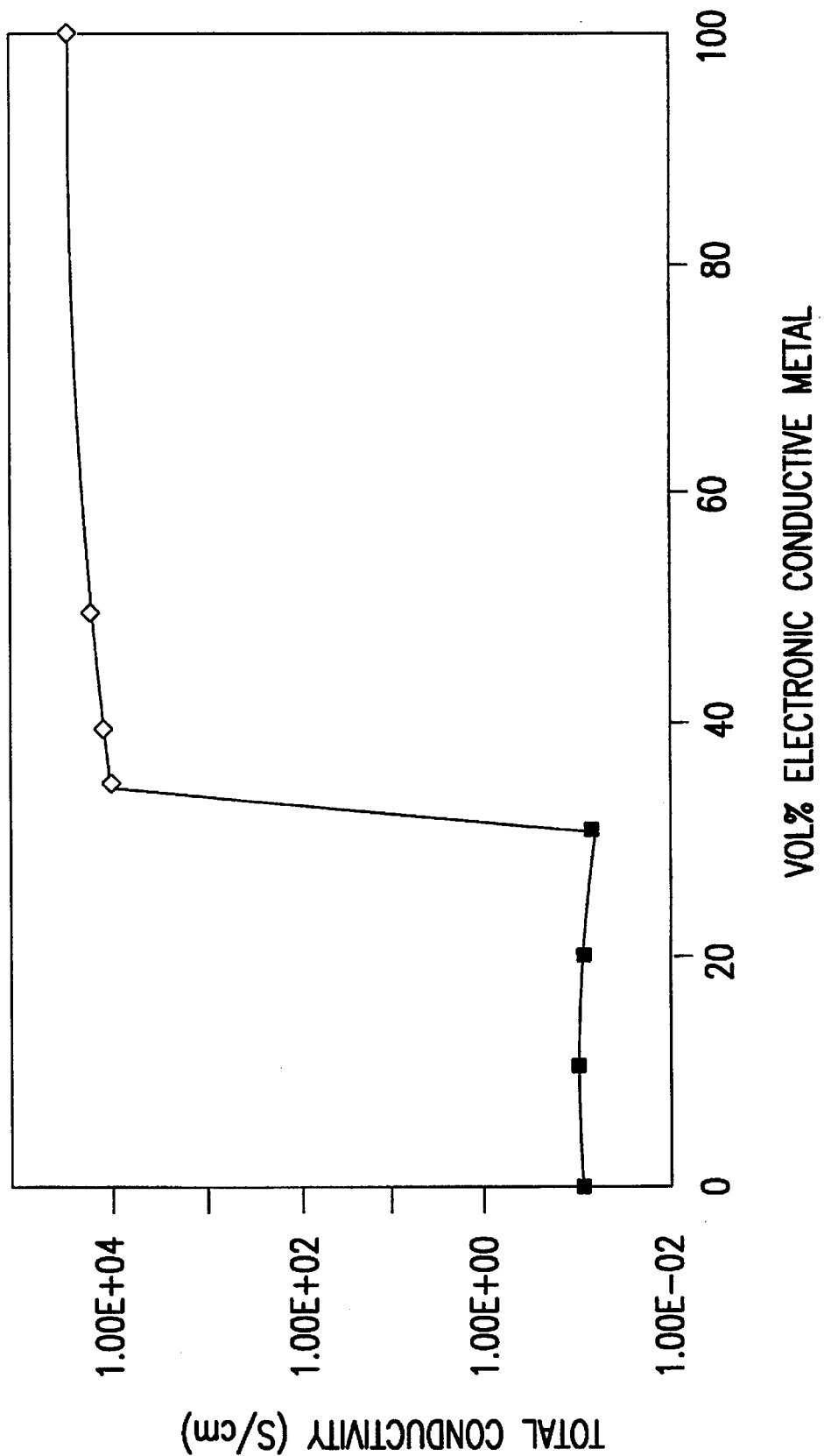

Total conductivity measurements of Samples A–F as a function of vol % Pd measured in air at 1000° C. are shown in FIG. 3C.

Oxygen permeation rates were carried out for Sample D using the same oxygen concentration cell described in Example III over a temperature range of 700° to 1000° C. are shown in FIG. 6.

While in the foregoing specifications this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A gas impervious mixed ionic-electronic conducting composite ceramic body having a non-homogeneous mixed microstructure comprising about 30 to about 90 volume percent of a predominantly ionic conducting phase for ionic conduction across said body by pressure differential and about 10 to about 70 volume percent of a predominantly electronic conducting phase, each said phase being continuous.

2. A gas impervious mixed ionic-electronic conducting composite ceramic body according to claim 1 wherein said predominantly ionic conducting phase is predominantly oxygen ion conducting and is present in about 60 to about 80 volume percent and said predominantly electronic conducting phase is present in about 20 to about 40 volume percent.

3. A gas impervious mixed ionic-electronic conducting composite ceramic body according to claim 2 wherein said predominantly electronic conducting phase is present in about 1 to about 5 volume percent greater than the minimum amount of said predominantly electronic conducting material necessary to establish a continuous phase.

4. A gas impervious mixed ionic-electronic conducting composite ceramic body according to claim 2 wherein said predominantly oxygen ion conducting phase comprises a material selected from the group consisting of cubic $Bi_2O_3$, cubic $CeO_2$, cubic $ZrO_2$ and mixtures thereof.

5. A gas impervious mixed ionic-electronic conducting composite ceramic body material according to claim 4 wherein said electronic conducting phase material is selected from the group consisting of a metal selected from the group consisting of Cu, Ag, Au, Zn, Cd, Hg, Ge, Ru, Os, Co, Rh, Ir, Ni, Pd, Pt and mixtures thereof; an electronically conductive metal oxide selected from the group consisting of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_3$, wherein y is a numeral of about 0.40 to 2.0 and M is selected from Cu, Ti, Vn, Cr, Mn, Fe, Co, Ni and mixtures thereof; and an electronically conductive perovskite material selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and δ is a number of 0 to a positive or negative number of about 0.3 to satisfy valence requirements.

6. A gas impervious mixed ionic-electronic conducting composite ceramic body according to claim 4 wherein said predominantly electronic conducting phase material is a metal is selected from the group consisting of Cu, Ag, Au, Zn, Cd, Hg, Fe, Ru, Os, Co, Rh, Ir, Ni, Pd, Pt and alloys thereof.

7. A gas impervious mixed ionic-electronic conducting composite ceramic body according to claim 4 wherein said predominantly electronic conducting phase is a metal selected from Ag, Pd and alloys thereof.

8. A gas impervious mixed ionic-electronic conducting composite ceramic body according to claim 4 wherein said oxygen ion conducting phase additionally comprises about 1 to about 50 mol % of an oxide stabilizer selected from the group consisting of a rare earth metal oxide, an alkaline earth metal oxide and mixtures thereof.

9. A gas impervious mixed ionic-electronic conducting composite ceramic body according to claim 8 wherein said stabilizer is selected from the group consisting of yttrium oxide, calcium oxide, erbium oxide, gadolinium oxide, ytterbium oxide, neodynium oxide and mixtures thereof.

10. A gas impervious mixed ionic-electronic conducting composite ceramic body according to claim 4 wherein said predominantly oxygen ion conducting phase is about 60 to about 80 vol % comprising about 60 to about 80 mol % cubic $Bi_2O_3$ stabilized with about 10 to about 50 mol % yttrium oxide stabilizer and said predominantly electronic conducting phase is about 20 to about 40 vol % comprising a metal selected from the group consisting of Ag, Pg, Ag/Pd alloys and mixtures thereof.

11. A gas impervious mixed ionic-electronic conducting composite ceramic body according to claim 4 wherein said predominantly oxygen ion conducting phase is about 60 to about 80 vol % comprising about 60 to about 80 mol % selected from the group consisting of cubic $CeO_2$ and $ZrO_2$ stabilized with about 5 to about 30 mol % of a stabilizer selected from the group consisting of calcium oxide and yttrium oxide and said predominantly electronic conducting phase is about 20 to about 40 vol % comprising a metal selected from the group consisting of Ag, Pg, Ag/Pd alloys and mixtures thereof.

12. A mixed ionic and electronic conducting composite ceramic gas impervious membrane having a thickness of about 1 to about 50 microns with high ambipolar conductivity having a non-homogeneous mixed microstructure comprising about 30 to about 90 volume percent of a predominantly ionic conducting phase for ionic conduction across said membrane by pressure differential and about 10 to about 70 volume percent of a predominantly electronic conducting phase, each said phase being continuous.

13. A mixed ionic and electronic conducting composite ceramic gas impervious membrane according to claim 12 wherein said predominantly ionic conducting phase is predominantly oxygen ion conducting and is present in about 60 to about 80 volume percent and said predominantly electronic conducting phase material is present in about 20 to about 60 volume percent.

14. A mixed ionic and electronic conducting composite ceramic gas impervious membrane according to claim 13 wherein said predominantly electronic conducting phase is present in about 1 to about 5 volume percent greater than the minimum amount of predominantly electronic conducting material necessary to establish a continuous phase of said predominantly electronic conducting material.

15. A mixed ionic and electronic conducting composite ceramic gas impervious membrane according to claim 13 wherein said predominantly oxygen ion conducting phase comprises a material selected from the group consisting of cubic $Bi_2O_3$, cubic $CeO_2$, cubic $ZrO_2$ and mixtures thereof.

16. A mixed ionic and electronic conducting composite ceramic gas impervious membrane according to claim 15 wherein said electronic conducting phase material is selected from the group consisting of a metal selected from the group consisting of Cu, Ag, Au, Zn, Cd, Hg, Ge, Ru, Os, Co, Rh, It, Ni, Pd, Pt and mixtures thereof; an electronically conductive metal oxide selected from the group consisting of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_3$, wherein y is a numeral of about 0.40 to 2.0 and M is selected from Cu, Ti, Vn, Cr, Mn, Fe, Co, Ni and mixtures thereof; and an electronically conductive perovskite material selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and δ is a number of 0 to a positive or negative number of about 0.3 to satisfy valence requirements.

17. A mixed ionic and electronic conducting composite ceramic gas impervious membrane according to claim 15 wherein said predominantly electronic conducting phase material is a metal selected from the group consisting of Cu, Ag, Au, Zn, Cd, Hg, Fe, Ru, Os, Co, Rh, Ir, Ni, Pd, Pt and alloys thereof.

18. A mixed ionic and electronic conducting composite ceramic gas impervious membrane according to claim 15 wherein said predominantly electronic conducting phase metal is selected from Ag, Pd and alloys thereof.

19. A mixed ionic and electronic conducting composite ceramic gas impervious membrane according to claim 15 wherein said oxygen ion conducting phase additionally comprises about 1 to about 50 mol % of an oxide stabilizer selected from the group consisting of a rare earth metal oxide, an alkaline earth metal oxide and mixtures thereof.

20. A mixed ionic and electronic conducting composite ceramic gas impervious membrane according to claim 19 wherein said stabilizer is selected from the group consisting of yttrium oxide, calcium oxide, erbium oxide, gadolinium oxide, ytterbium oxide, neodynium oxide and mixtures thereof.

21. A mixed ionic and electronic conducting composite ceramic gas impervious membrane according to claim 15 wherein said predominantly oxygen ion conducting phase is about 60 to about 80 vol % comprising about 60 to about 80 mol % cubic $Bi_2O_3$ stabilized with about 10 to about 50 mol % yttrium oxide stabilizer and said predominantly electronic conducting phase is about 20 to about 40 vol % comprising a metal selected from the group consisting of Ag, Pg, Ag/Pd alloys and mixtures thereof.

22. A mixed ionic and electronic conducting composite ceramic gas impervious membrane according to claim 15 wherein said predominantly oxygen ion conducting phase is about 60 to about 80 vol % comprising about 60 to about 80 mol % selected from the group consisting of cubic $CeO_2$ and $ZrO_2$ stabilized with about 5 to about 30 mol % of a stabilizer selected from the group consisting of calcium oxide and yttrium oxide and said predominantly electronic conducting phase is about 20 to about 40 vol % comprising a metal selected from the group consisting of Ag, Pg, Ag/Pd alloys and mixtures thereof.

23. A process for oxygen separation from an oxygen containing gas comprising contacting a first side of a gas impermeable mixed oxygen ion and electronic conducting membrane with said oxygen containing gas concurrently with withdrawing oxygen ions from a second opposite side of said membrane maintained at a lower pressure than said first side, said mixed oxygen ion and electronic conducting membrane comprising a composite ceramic gas impervious membrane having a thickness of about 1 to about 50 microns with high ambipolar conductivity and having a non-homogeneous mixed microstructure comprising about 30 to about 90 volume percent of a predominantly oxygen ion conducting phase and about 10 to about 70 volume percent of a predominantly electronic conducting phase.

24. A process for oxygen separation according to claim 23 wherein said mixed ionic and electronic conducting composite ceramic gas impervious membrane has about 60 to about 80 volume percent said predominantly oxygen ion conducting phase material and about 20 to about 40 volume percent said predominantly electronic conducting phase material wherein each said phase is continuous.

25. A process for oxygen separation according to claim 24 wherein said predominantly electronic conducting phase is present in about 1 to about 5 volume percent greater than the minimum amount of predominantly electronic conducting material necessary to establish a continuous phase of said predominantly electronic conducting material.

26. A process for oxygen separation according to claim 23 wherein said predominantly oxygen ion conducting phase comprises a material selected from the group consisting of cubic $Bi_2O_3$, cubic $CeO_2$, cubic $ZrO_2$ and mixtures thereof in an amount of about 60 to about 80 volume percent and said predominantly electronic conducting phase material is selected from the group consisting of Ag, Pd and alloys thereof in an amount of about 20 to about 40 volume percent.

* * * * *